May 4, 1965  D. L. HINGS  3,182,328
RADIO CONTROL SYSTEM
Filed Feb. 2, 1961  7 Sheets-Sheet 1

INVENTOR.
DONALD L. HINGS
BY Woodling, Krost,
Granger and Rust, attys

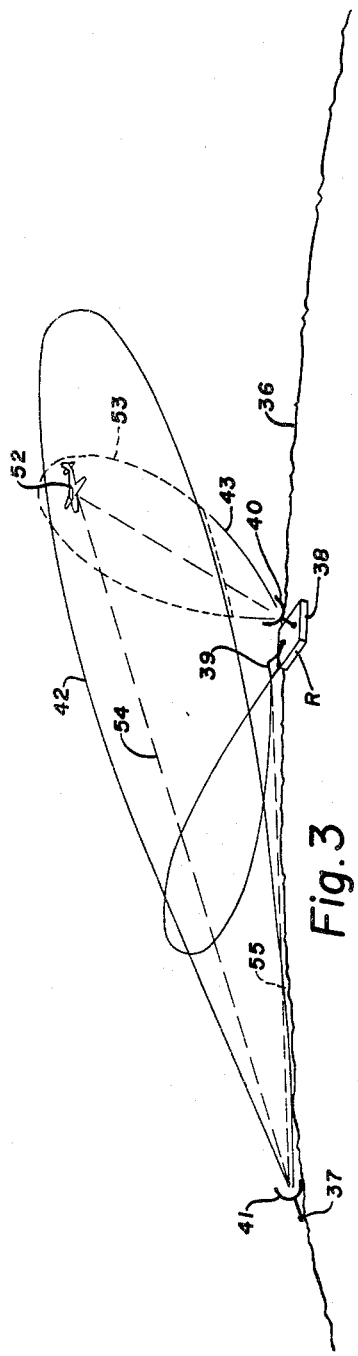
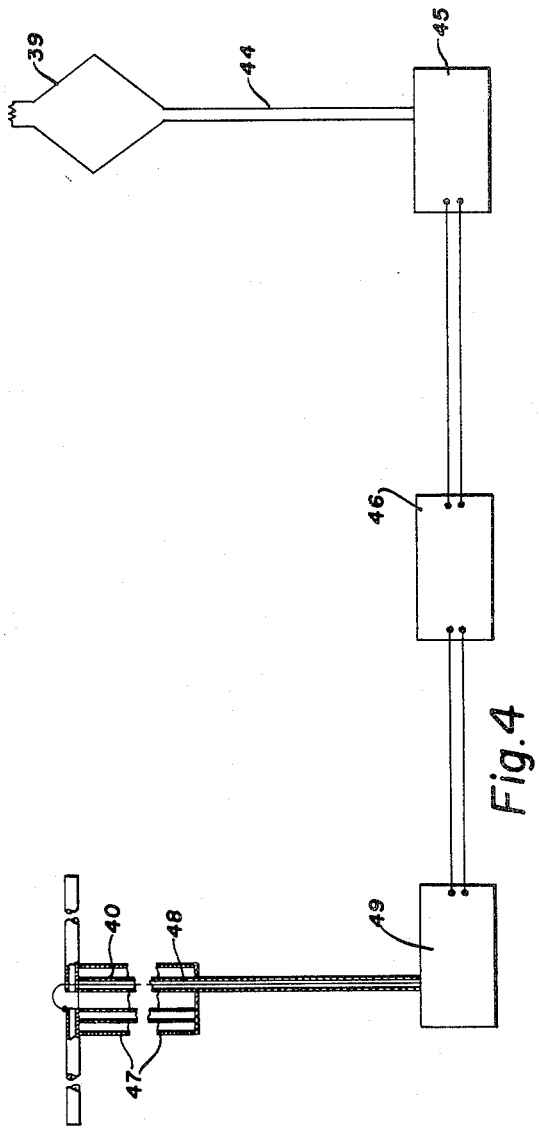

INVENTOR.
DONALD L. HINGS
BY Woodling, Krost,
Granger and Rust, attys.

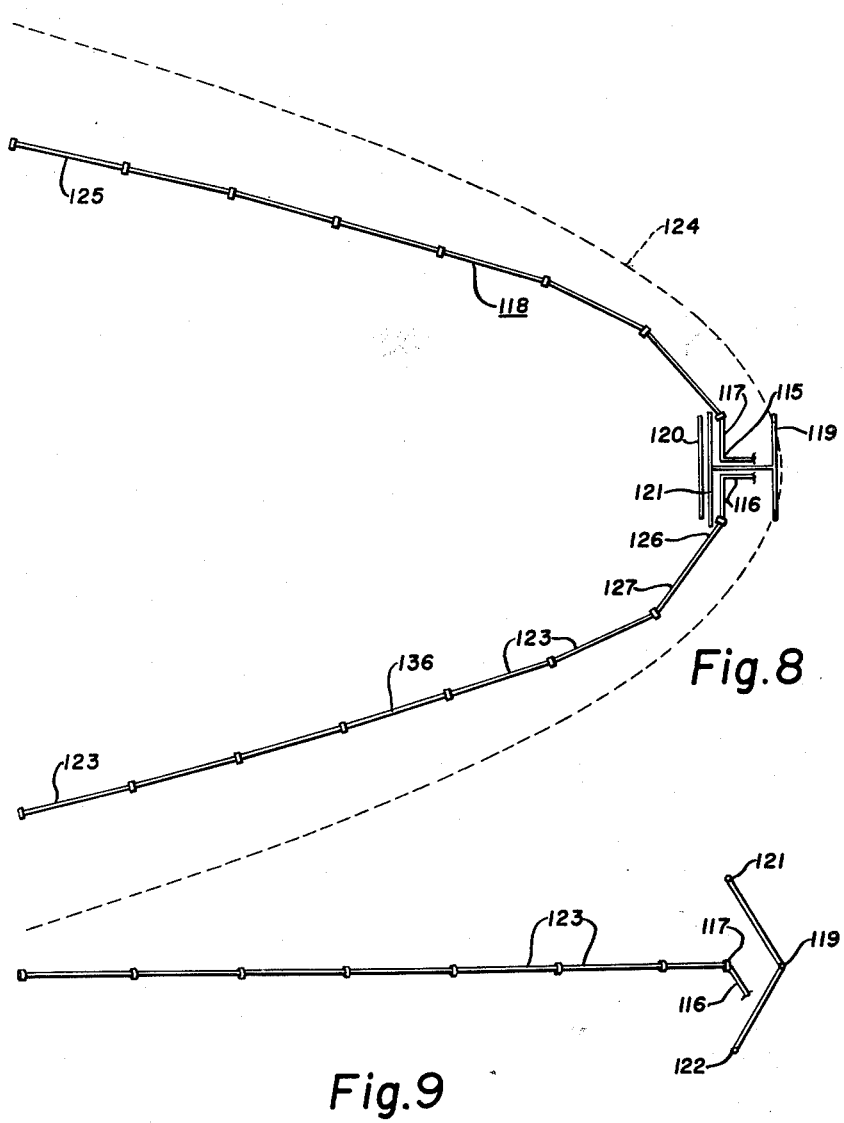

INVENTOR.
DONALD L. HINGS

INVENTOR.
DONALD L. HINGS 3,182,328
RADIO CONTROL SYSTEM
Donald L. Hings, 281 N. Howard Ave., Vancouver,
British Columbia, Canada
Filed Feb. 2, 1961, Ser. No. 86,815
13 Claims. (Cl. 343—112)

The invention relates in general to the reception of electromagnetic waves and more particularly to a radio system which will detect the passage of moving objects such as aircraft. One practical illustration of the system utilizes radio waves emanating from a remote source and received on two different receiving antennas to be combined as a received wave with a beat frequency produced to obtain intelligence which indicates the presence of a moving reflecting means and such as an aircraft within the field of the antennas.

This case is a continuation-in-part of my application, Serial Number 811,035, filed May 5, 1959, entitled "Antenna System."

The system generally relies upon the Doppler principle of beat frequencies caused by the same radiated wave being received at a receiver location by two different paths of relatively varying lengths. This variation in the relative path lengths produces a changing phase between the two received signals to produce a beat note in accordance with the difference in path lengths at any given instant. As these path lengths relatively vary in length, the beat note changes frequency in proportion to the difference.

The Doppler principle is well known, and one publication describing the operation is "Frequency Modulated Radar" by David G. C. Luck, R.C.A. Labs., Princeton, New Jersey, McGraw-Hill, 1949, at page 418, describing "Effects of Speed."

One system for utilizing this Doppler principle is to have two separate receiving antennas at a receiver location remote from the transmitter location. The first receiving antenna receives the direct wave from the transmitter, and the second receiving antenna receives the indirect or reflected wave from the moving object such as an aircraft which provides the relatively varying path lengths. These two received signals are then fed to a common utilization or receiver system for obtaining the beat frequency. The transmitting antenna in this system should be a focal point radiator which is the closest approach to the theoretical isotropic antenna or elemental length dipole. This provides a spot or point source for the radiated waves so that the radiated waves have a definite phase at a point in space at any given instant of time. The first receiving antenna should be a different type of antenna; namely, the commonly termed travelling wave or single wave antenna which does not have a focus. The fact that it is a travelling wave antenna permits it to receive wave energy from wherever it is directed at a mean frequency of the energy received. The second receiving antenna should be a type similar to that used in the transmitting antenna; namely, a focal point collector, so that the received wave, which in this case is the reflected wave from the aircraft, has a definite phase. The first receiving antenna is generally not responsive to Doppler effects in and of itself because of its being a travelling wave type; yet when the received signals from the first and second receiving antennas are compared, the relatively varying path lengths produce the Doppler effect.

The second system utilizing the Doppler principle again utilizes one transmitter and two receiving antennas at a remote location, but in this case all antennas are focal point radiators or collectors. The radiated wave is preferably highly attenuated at the receiver location so that even if the two receiving antennas are beamed at the transmitter location, there is practically no direct wave received. However, if a moving reflecting object travels through a zone of detection which is determined by the incidence of field patterns of the three antennas, then a Doppler effect will be obtained. This is because the moving object reflects the radiated waves and in effect becomes a secondary source of waves. These reflected waves are re-radiated to both receiving antennas to be received thereby. The movement of the object or aircraft changes the relative path length between the moving aircraft and the two receiving antennas, and this again creates a Doppler effect between the two received signals which are compared at a common phase point, with the common phase point supplying an input to a receiver or other detecting device.

A principal difference between the two described systems is that in the first system a direct reference signal from the transmitter to the receiver location is required, whereas in the second system no reference signal is required and may be operated beyond the direct ground range of the transmitter, such as due to the curvature or intervening contour of the earth. Therefore, the two systems may be called reference and non-reference Doppler systems, respectively.

Both systems can be operated at many frequencies including the HF spectrum, but are perhaps most suited to performances experienced in the VHF and UHF spectrums.

An object of the invention is to provide systems for detecting the presence of moving aircraft.

Another object of the invention is to provide systems for detection of moving objects by the Doppler principle.

Another object of the invention is to provide means to determine direction of flight of an aircraft, to locate the position of an aircraft with respect to the ground to determine speed and to determine the altitude of the aircraft.

Another object of the invention is to provide a generally vertical wall or zone of Doppler detection which may be oriented at any desired angle relative to a transmitter location.

Another object of the invention is to utilize a plurality of zones of detection as accomplished by receiver locations for only one transmitter and at any desired distance from the transmitter.

Another object of the invention is to provide an antenna system which may be used with this Doppler moving object detection system with the antenna system capable of achieving a directed beam which may be scanned or swept through the sky in any desired direction.

Another object of the invention is to provide a highly directional antenna array which may be easily used in the VHF or UHF spectrum and which antenna array may be arranged along radials generally from a focal point so that the radiated beam of the complete antenna system may be electrically switched to achieve a scanning of the effective beam of the entire antenna system.

Another object of the invention is to provide an antenna array which utilizes a resonant driven element and which has parasitic collector elements with high impedance coupling to the ends of the driven element to increase the gain and directivity of the driven element.

Another object of the invention is to provide an antenna array which utilizes antenna elements which may be termed collector elements positioned generally parallel to the elliptical Fresnel zones of the antenna array, considering this antenna array to have Fresnel zones with respect to another antenna, with one antenna being a transmitter and the other being a receiver.

Another object of the invention is to provide an airport control system which will detect the presence of aircraft around the airport, for example, arriving and departing along flight paths and which may be used to give a continuous indication of height of the aircraft as it approaches on a letdown and glide path to the airport.

Another object of the invention is to provide an airport control system which will supply continuous information on an aircraft flying to or from the airfield to guide the aircraft in both the vertical and horizontal planes at predetermined angles and to indicate the relative speed.

Another object of the invention is to provide an airport control system which will supply instant data in a form suitable for the automatic control of aircraft when suitable receiving means in the aircraft is used for reception of the data from the airport control system.

Another object of the invention is to set forth a Doppler controlled landing and take-off path to thereby reduce the hazard of human error in the control of aircraft.

Other objects and a fuller understanding of this invention may be had by referring to the following description and claims, taken in conjunction with the accompanying drawings, in which:

FIGURE 3 is a perspective view of a first system for moving object detection;

FIGURE 4 is a circuit diagram of the connection of the receiving antennas of FIGURE 3;

FIGURE 8 is a plan view of a directive antenna array usable in this Doppler detection system;

FIGURE 9 is a side view of the antenna of FIGURE 8;

Figure 1:
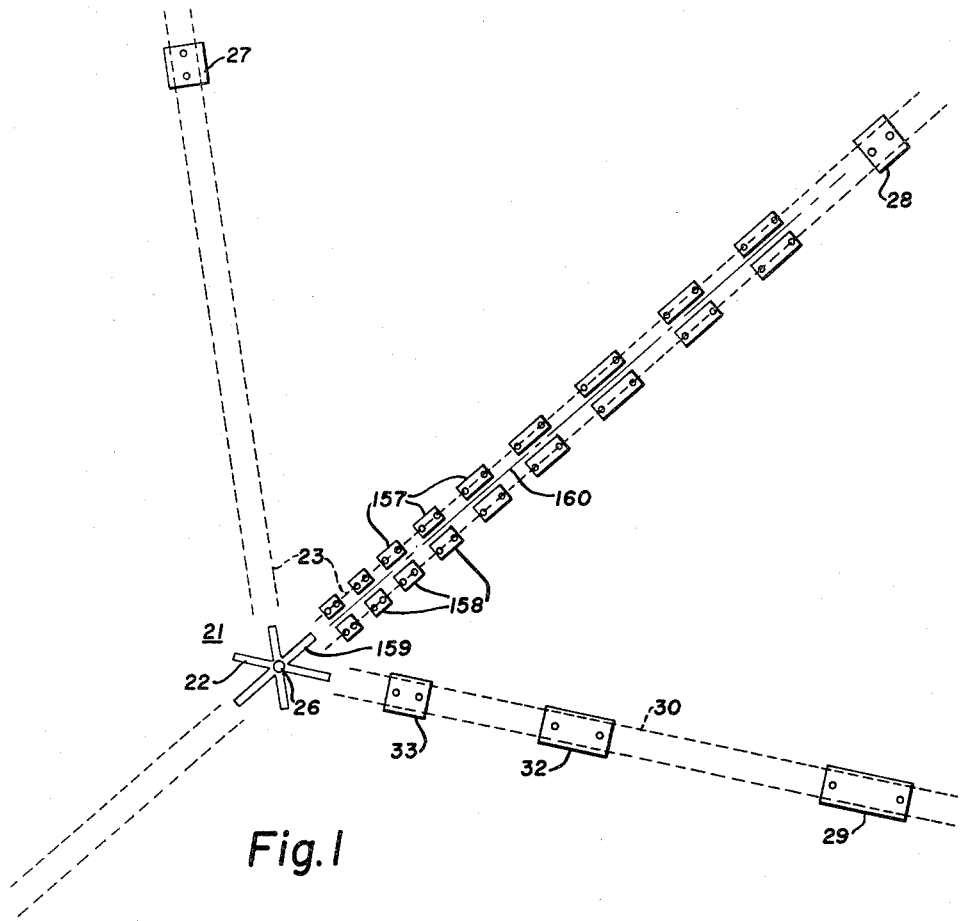
FIGURE 1 is a plan view of a ground radio control system utilizing the Doppler principle of this invention.
Figure 2:
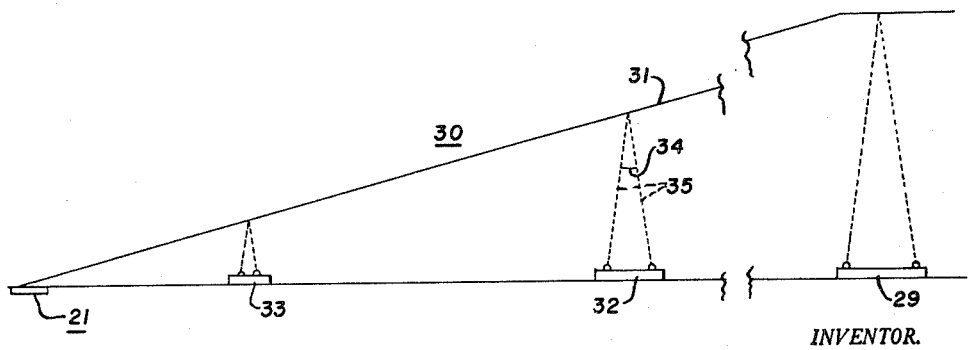
FIGURE 2 is a vertical elevation of part of the system of FIGURE 1.

The FIGURES 1 and 2 demonstrate one use for the Doppler detection systems of the invention. It may be used in conjunction with an airport 21 having runways 22 and commercial airways 23 on which aircraft fly toward and away from the airport 21. A transmitter location 26 is located at the airport 21 and receiver locations 27, 28, and 29 may be placed along the various airways 23 at any desired distance and spacing. The receiver locations will provide a means for detection of the passage of an aircraft near such location and therefore they may be placed at any desired distance from the airport 21. This might be thirty to fifty miles, for example, or may be as close as the runways.

The FIGURE 2 is an elevation through one of the airways 30 and shows a desired glide path 31 of aircraft approaching the airport 21. The receiver location 29 is shown on FIGURE 2 as well as additional receiver locations 32 and 33. Each of these receiver locations 29, 32, and 33 will detect the passage and position of aircraft approaching along the glide path 31.

The FIGURE 3 explains one system of Doppler detection which may be used in the radio control system of FIGURES 1 and 2. FIGURE 3 shows the earth surface 36 as a curving surface, since this detection system may be used at long distances whereat the curvature of the earth becomes important. A transmitter location is shown at 37 and a receiver location 38 is provided at some remote point. The receiver location 38 has first and second receiving antennas 39 and 40, respectively.

The transmitter location 37 has an antenna 41 which is a focal point radiator or point source radiator so that the radiated wave has a definite phase relationship at any given point in space at any given instant of time. The second receiving antenna 40 is also of the same type so as to be capable of receiving a wave which has a definite phase relationship. However, the first receiving antenna 39 is a travelling wave or single wave type of antenna.

The transmitting antenna 41 may be beamed toward the receiver location 38 with a beam 42 as shown in FIGURE 3, or it may be of the omnidirectional type such as would be used in the system shown in FIGURE 1 in order to be received at the many receiver locations. Even if the transmitting antenna beam of FIGURE 1 were omnidirectional it could still be directional to the extent that it would be beamed down toward the horizon as shown in FIGURE 3.

The first receiving antenna 39 may be either the V type antenna or a rhombic type antenna or any other suitable form of travelling wave antenna. It is preferably beamed toward the transmitter location 37, to receive the direct wave from the transmitting antenna 41. The second antenna 40 is capable of sweeping or scanning through a portion of the sky which, for example, may be from the horizon to the zenith, or from horizon to horizon. The wall or zone of detection 53 for this system will, therefore, be anywhere within the area determined by the coincidence or incidence of the transmitting antenna beam 42 and the scanning beam 43 from the second received antenna 40.

The two receiving antennas 39 and 40 are connected as shown in FIGURE 4. The receiving antenna 39 is connected through a feed line 44 to a preamplifier 45 and then to a detector or receiver device 46. The focal point collector type receiving antenna 40 is shown as a simple resonant dipole in FIGURE 4 and is connected by means of a Balun 47 to a coaxial feed line 48 and then to a preamplifier 49 which in turn is connected to another input of the detector 46. The two incoming signals may be mixed by any convenient means and applied to the detector 46 and the preamplifier 45 and 49 show one such means. These may be used to adjust the relative gain or attenuation of the two signals. The detector 46 is thus a common phase point for comparing the phase or frequency of the two received signals.

The receiving antenna 39 is beamed toward the transmitting antenna 41 to receive the direct wave; and when an aircraft 52 enters the zone of detection 53 as shown by the dotted line in FIGURE 3, a reflected wave may travel the path 54 from the transmitting antenna 41 to the second receiving antenna 40. The direct wave travels in a path 55 from the transmitting antenna 41 to the first receiving antenna 39. The relatively varying lengths of the two paths 54 and 55 caused by the movement of the aircraft 52 establish a beat frequency at the detector 46 in accordance with the Doppler principle.

Figure 5:
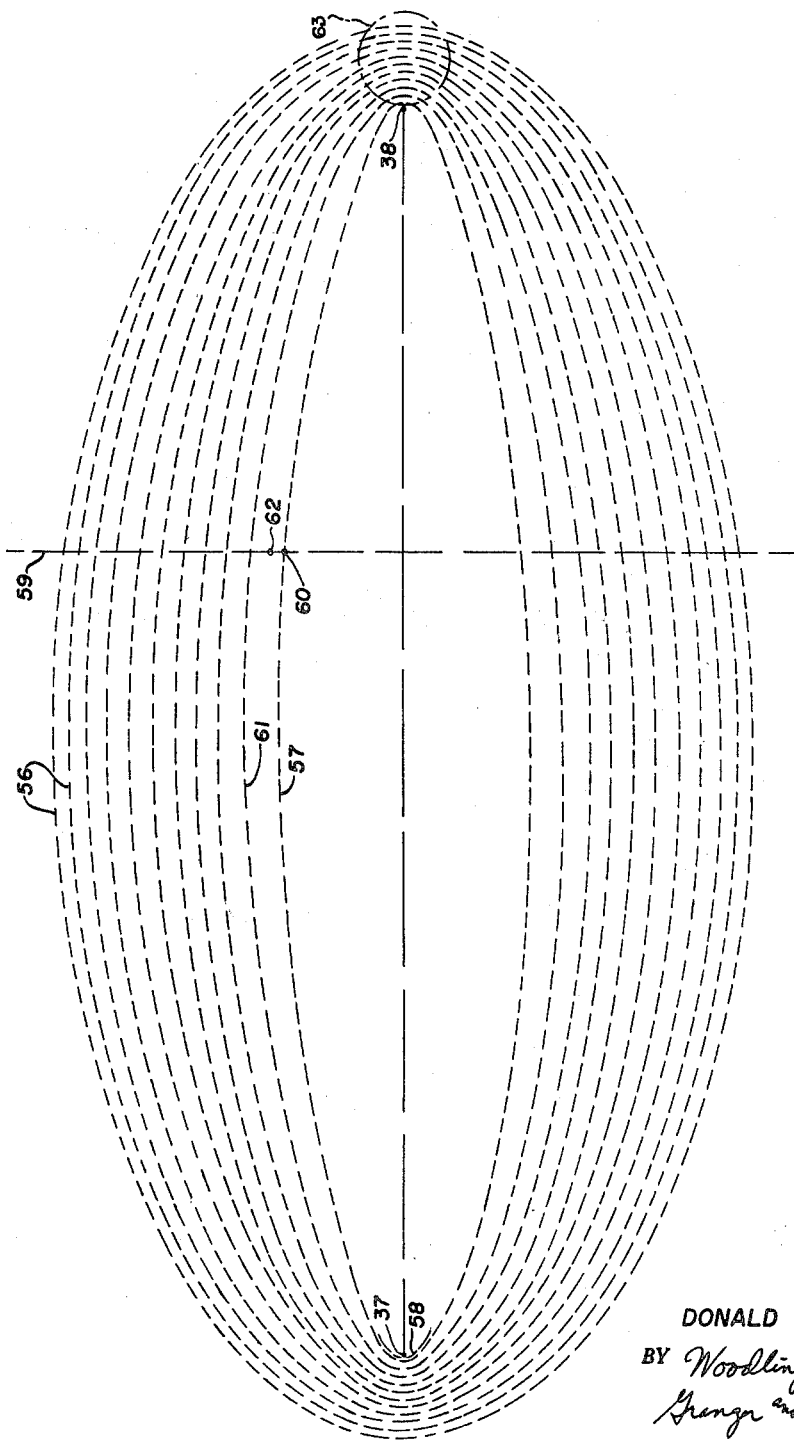
FIGURE 5 is a plan view of receiving and transmitting antennas showing the Fresnel zones.

The FIGURE 5 is a plan view of the transmitter location 37 and receiver location 38 considering for the moment only a single receiving antenna at the location 38. A series of ellipses 56 defines the Fresnel zones as determined by the transmitting and receiving antennas. The first Fresnel zone is shown by the ellipse 57. All of the Fresnel zones have the transmitting and receiving antenna locations as the two focal points of the series of ellipses. The first Fresnel zone 57 passes one-quarter wave length to the rear of each antenna, with respect to each other, as shown at the point 58 for the transmitter location. A reference line 59 has been shown on FIGURE 5; and if a reflecting object is placed at the point 60, for example, which is the intersection of the first Fresnel zone 57 and the line 59, then the reflected wave from the transmitter location 37 to the receiver location 38 by way of the point 60 will be one-half wave length longer than the direct wave from the transmitter to the receiver. This is the same as if the reflecting medium were placed at the point 58 one-quarter wave length to the rear of the transmitter location 37. In this case also the reflected wave travels one-half wave length greater distance in space to reach the receiving antenna. Therefore, reflectors positioned anywhere on the first Fresnel zone 57 affect the receiver antenna similarly. The second Fresnel zone 61 is at a location for the reflected wave to be one and one-half wave lengths longer than the direct path, and each additional Fresnel zone adds an additional wave length to the length of the reflected path.

The first Fresnel zone 57 in any event causes addition of the two waves at the receiving antenna location 38 as do reflectors in any of the other Fresnel zones whereas reflectors half way between the Fresnel zone, such as at point 62, cause subtraction. Therefore an object, moving along the line 59, which will reflect waves from the transmitter to the receiver will cause alternate addition and subtraction to produce a beat note at the detecor 46 dependent upon the rate of cutting the Fresnel zones.

It will be noted that to the rear of the receiver location 38 in the area 63, the Fresnel zones are relatively closely and uniformly spaced so that when this system of Doppler detector is applied to the airport control system of FIGURES 1 and 2 any aircraft approaching the airport and approaching to the rear of the receiver location 29 will pass through these Fresnel zones at their known spacing so as to determine the flight characteristics of the aircraft. The aircraft altitude in approaching the airport on the glide path will be generally known, and thus the ground speed of the aircraft may readily be determined by the pitch of the beat note, and determine the point when the aircraft passes over the receiver by the termination of the beat note.

The FIGURE 2 shows the three receiver locations 29, 32, and 33 to have the two receiving antennas thereat of successively closer spacing. This permits the angle 34 between the wave paths 35 to be constant for each of the several receiver locations, so long as the aircraft remains along the predetermined glide path 31. With this constant angle 34, the pitch of the beat note will be the same for each of the receiver locations. Therefore, as an aircraft approaches each of the receiver locations at a relatively constant speed on the glide path, any variation in the pitch of the beat notes for the successive locations will indicate a departure of the aircraft from the predetermined glide path. This knowledge can be of immense help in landing under instrument conditions.

The second receiver antenna 40, in the first Doppler detection system, shown in FIGURES 3 and 4, is a focal point antenna, so that the waves reflected from the aircraft 52 will have a definite phase relationship. The first receiving antenna 39, in FIGURES 3 and 4, is a travelling wave antenna so as not to have any Doppler effect on this one antenna alone. For example, if an aircraft is within the beam or field of the second antenna 39, energy will be received at this antenna both directly from the transmitting antenna 41 and indirectly as reflected from the aircraft. However, the travelling wave antenna has been found to receive wave energy which is a mean frequency of all waves received thereon. Therefore, a comparison of the signals received on the two receiving antennas will produce a beat note caused by the relatively varying phase of the two signals to indicate passage of aircraft.

Figure 6:
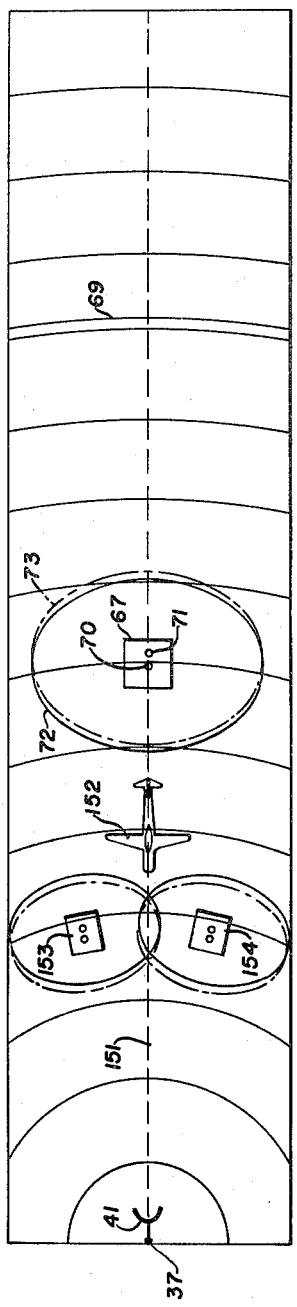
FIGURE 6 is a plan view of a second Doppler detection system.
Figure 7:
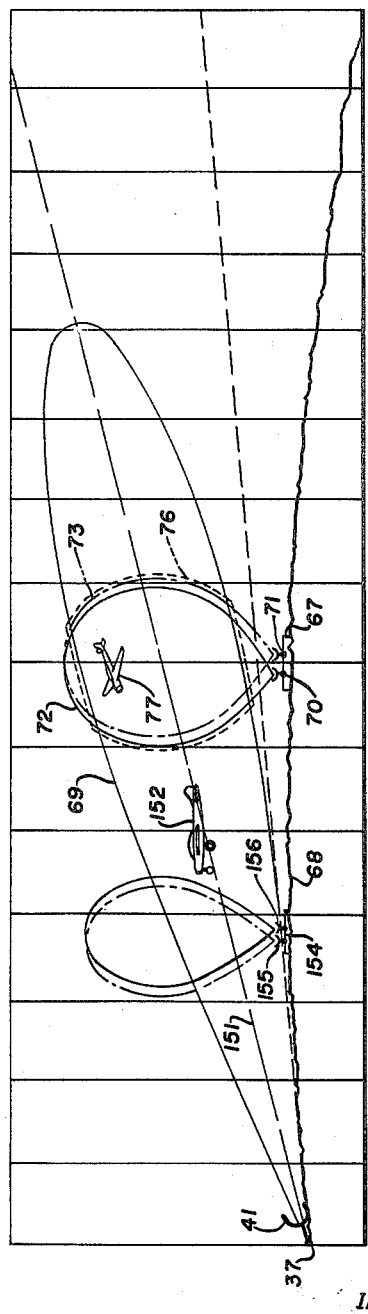
FIGURE 7 is an elevational view of the system of FIGURE 6.

The FIGURES 6 and 7 show a second system for Doppler detection of moving objects which may also be used in the system of FIGURE 1. FIGURE 6 is a plan view showing the transmitter location 37 again having the transmitting antenna 41 which again is the focal point radiator. A receiver location 67 is shown as positioned on the earth's surface 68 at a point below the line of sight and below the radiated beam or field 69 from the transmitting antenna 41. At the receiving location 67 there is again provided two receiving antennas 70 and 71. Both antennas have beams directed upwardly with a receiving antenna 70 having a beam 72 and the receiving antenna 71 having the beam 73. Both of the receiving antennas 70 and 71 are of the focal point collector type shown as shown at 40 in FIGURE 4. In a manner similar to that shown in FIGURE 4 both antennas 70 and 71 are connected to a common phase point for comparison of the phase of the two received signals. In this system of FIGURES 6 and 7 the zone of detection is indicated at 76 and is the coincidence of the fields of all three antennas. Any aircraft 77 within this zone of detection will receive energy from the transmitting antenna 41. It will reflect or re-radiate this energy to the two receiving antennas 70 and 71 and thus may be considered as a source of radiant energy. The two receiving antennas 70 and 71, being below the beam 69 of the transmitting antenna 41, do not receive the direct wave from this transmitting antenna 41. If the distance between the transmitter and receiver locations is not sufficient to accomplish this, other means may be used to provide suitable attenuation of the direct wave, such as placing the receiver location behind a terrain obstruction, or using directional antennas not beamed toward the transmitter.

The wave re-radiated from the aircraft 77 is received by the two receiving antennas 70 and 71. Because of the movement of this aircraft 77, the relative lengths of the two wave energy paths will vary, thus again causing a beat note by the Doppler principle.

This system of Doppler detection may be used in the airport control system as shown in FIGURE 1 with the receiver location 67, for example, being substituted for the receiver location 27 in FIGURE 1. Thus, in this figure the two receiving antennas thereat would have their beams directed upwardly to establish a zone of detection where these beams intersected the field of the transmitting antenna 26; therefore, any aircraft travelling along the airway 23 and passing through this zone of detection would indicate its presence by a beat note at the detector being fed by the two receiving antennas.

Figure 14:
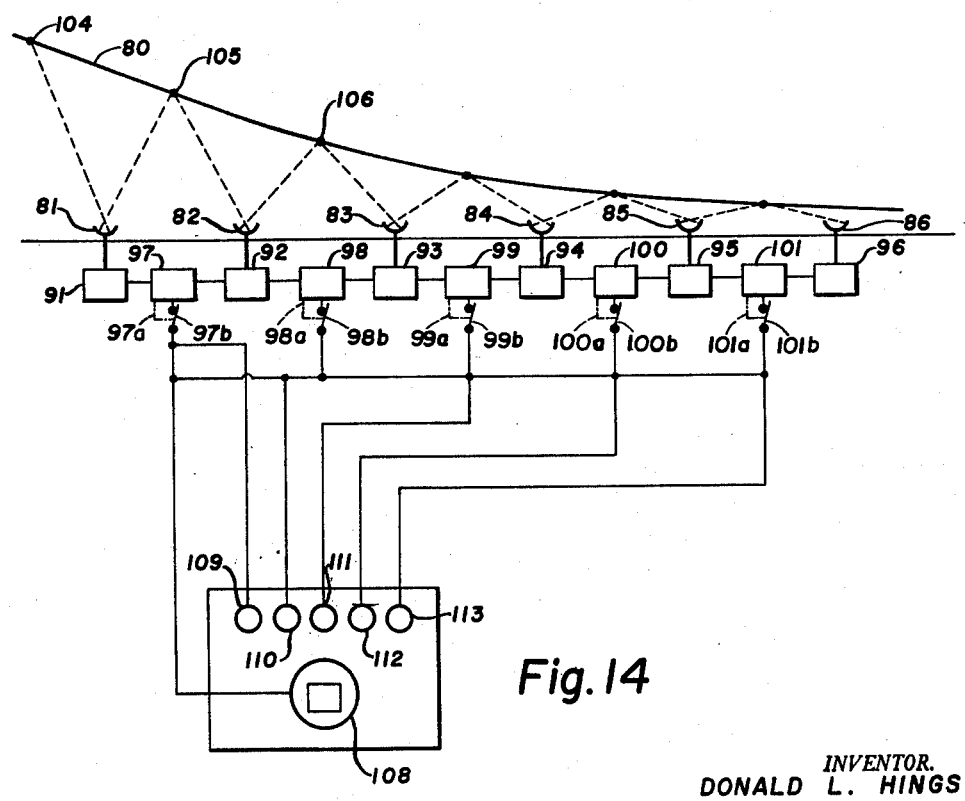
FIGURE 14 is a circuit diagram of an aircraft approach system for an airport.

FIGURE 14 shows an aircraft approach system for an airport which may be used with the system of FIGURE 1. A glide path is shown at 80 which could be the letdown and approach path of aircraft intending to land at the airport 21. A plurality of receiving locations may be established along the surface of the earth underneath this glide path 80. These locations are indicated by first through sixth receiving antennas 81 to 86, inclusive. Line amplifiers 91 to 96, inclusive, are fed by each of the receiving antennas 81 through 86. Between each adjacent pair of line amplifiers there is a detector with a total of five detectors for the sixth line amplifiers. These detectors are numbered from 97 to 101, inclusive. Each detector is therefore fed by two receiving antennas similar to the circuit shown in FIGURE 4. An aircraft approaching along the glide path 80 may thus be detected by the receiving antennas 81 through 86. At point 104 on the glide path, for example, an aircraft would be re-radiating signals from the transmitting antenna to each of the receiving antennas 81 and 82. The beat note is therefore increasing in pitch between the point 104 and a point 105. At this point 105 it is midway between the receiving antennas 81 and 82 and the pitch will be maximum. As the aircraft passes the point 105 and approaches a point 106, the pitch will then decrease. The outputs of each of the detectors 97 through 101 is fed to a Doppler position and height indicator 108 which may be at any suitable location, even at the control tower at the airport. This indicator 108 may be of any suitable form, either audible or visual, to indicate pitch from which may be determined flight characteristics for aircraft approach. For example, the indicator 108 could be a loudspeaker, or a frequency sensitive relay controlling lamps or alarms. If the approximate speed of the aircraft on the glide path is known, then the height above the ground may be determined by the pitch of the highest beat note received which also will be determined by the relative spacing of the several receiving antennas. Conversely, if the aircraft height is known, its ground speed may be determined. Also, at the instant when the beat note reaches its maximum pitch, it will be known that the aircraft is at the point 105 on the glide path. This information can be relayed if desired to the aircraft over the airport tower radio control system, to be utilized by the aircraft pilot as an instrument landing aid.

This entire system may be used as an automatic indication to the control tower personnel of the approach of a landing aircraft and its height, direction, and location along that glide path, which is operable in all weather conditions. Each of the detectors 97 through 101 may incorporate a variable frequency discriminator between rising and falling audio tones. The beat note or audio tone increases as the aircraft travels from point 104 to point 105 and then decreases on passing point 105. The variable frequency discriminators are therefore set to operate an indicator, preferably in conjunction with the position and height indicator 108. These indicators may be something such as signal lamps 109 to 113, inclusive, connected to the respective variable frequency discriminators at the detectors 97 through 101 with each lamp being illuminated as the aircraft passes the mid-point between the two associated receiving antennas.

The variable frequency discriminator also, acting through control linkage 97a–101a, momentarily opens a switch 97b–101b on the output of the detector from the preceding receiving antenna. For example, the frequency discriminator at the detector 97 momentarily disconnects the signal from the receiving antenna 81 from the detector 97 output until the aircraft is out of its field. This makes certain that no beat note will occur between the first and third receiving antennas, instead the only beat would be produced between the second and third antennas. This sequence is maintained throughout the flight and glide paths with the antennas being sequentially disconnected for a short time, and simultaneously the corresponding lamps 109 through 113 will be momentarily illuminated to indicate to the control tower personnel the location of the aircraft. The time between the successive switching periods determines the speed of the aircraft, and the direction of the aircraft is, of course, also observable. The antenna 86 is preferably mounted in a pit below the surface of the airport runway.

The FIGURES 6 and 7 also show an additional use of the system; namely, to determine the horizontal deviation from a desired glide path 151 of an aircraft 152. Receiver locations 153 and 154 form a pair of receiver locations which are positioned equidistantly on each side of the glide path 151. Each of these receiver locations again has first and second receiving antennas 155 and 156 establishing an upwardly directed beam or field pattern. As shown in FIGURE 6, the beams of the antennas from each of the receiver locations 153 and 154 overlap along the glide path 151. The relative strength of the energy received at the two receiver locations may be compared to determine if the aircraft 152 is to the right or to the left of the desired glide path 151. If it is to the right of this path, it will be more above the receiver location 153 and thus the signal strength at this receiver location will be greater than at the location 154. Thus, a comparison of these two signal strengths, for example, at the second receiving antennas 156 of each location will give a determination of the horizontal deviation of the aircraft 152 from the glide path 151.

The FIGURE 1 shows how this system may be used in the airport radio control system where a first row of receiver locations 157 is positioned along one side of the glide path 160 leading to an airport runway 159, and a second row of receiver locations 158 is positioned along the other side of the glide path 160. As long as an aircraft flies along the glide path 160, it will remain equidistant to the two receiver locations in each pair, and thus the relative signal strengths will remain equal. These rows of receiver locations are preferably parallel; however, they may diverge slightly as the distance to the runway increases in order to maintain the same relative spacing of the beams from the antennas as shown in FIGURE 6. Preferably, the spacing between the first and second receiving antennas at each of the receiver locations increases as the distance from the runway increases in order to maintain constant the angle 34 as shown in FIGURE 2; and thus the pitch of the maximum beat note received will be uniform for each of the pairs of receiver locations as the aircraft descends along the flight path. Also, as shown in FIGURE 1, the receiver locations may be positioned closer together near the runway than more remote from the runway in order to give more frequent indications of speed, height, and horizontal deviation at the more critical instrument flight conditions which are just before point of touchdown of the aircraft. This information of speed, height, and horizontal deviation may be transmitted over the tower radio control system, for example, to the aircraft for use by the pilot in his instrument landing approach to the runway 159.

The FIGURES 8 and 9 show a directive antenna array which may be used with this Doppler detection system and which is quite suitable for the VHF spectrum, and even the HF and UHF spectrums. The antenna utilizes a driven element which has been shown as a resonant one-half wave dipole 117 and which is a focal point radiator. This dipole 117 may be connected as shown in FIGURE 4. The dipole has its length determined so as to be resonant at the operating frequency of the entire antenna array 118. A reflector 119 may be used which may conveniently be the Yagi type reflector and which typically is cut to be longer than the dipole 117. The reflector 119 is, of course, positioned to the rear of the dipole 117, relative to the radiation pattern of the antenna. An element 120 may be positioned in front of the dipole 117, and this element may be considered a director or an impedance matching element. It has been found most effective when positioned in the order of one-tenth wave length from the dipole 117 and has a length less than the length of the dipole 117 to thus be similar to director elements used in a Yagi type antenna array. Additional reflector elements 121 and 122 are positioned above and below the dipole 117 in ninety degree space-phase relationship thereto. These reflector elements narrow the beam in a vertical direction.

A novel feature of the antenna array 118 is the inclusion therein of antenna elements which are termed collector elements 123. These have been found most effective when having a length equal to one-half wave length of the operating frequency so as to be resonant with the dipole 117. These collector elements co-linearly extend along a curved line which appears to be an ellipse and which appears to be generally parallel to and inside of the ellipse of the first Fresnel zone 124. This first Fresnel zone 124 is known to pass one-quarter wave length to the rear of the dipole 117, and generally passes through the reflector 119. The positioning of the reflector element 119 is roughly one-quarter wave length to the rear of the dipole 117, although this may vary slightly depending upon the impedance match of the antenna to the feed line, for example. This spacing may be .28 of the operating wave length yet remains ninety degrees in space-phase relationship to the dipole 117.

It has been observed that elements which are cut to be reflector elements may be positioned along and tangent to this first Fresnel zone 124 and are effective to somewhat increase the gain of the entire antenna array 118. The position of such reflector elements would indicate that the first Fresnel zone 124 diverges from the position of the collector element 123 at the front end or open end 125 of the antenna array 118. Thus, the collector elements 123 may be considered to be generally parallel to and within the first Fresnel zone 124.

The collector elements 123 may be supported in any suitable manner and are preferably supported at the mid-points, such as the mid-point 136, where the current would be maximum but the voltage would be minimum. The ends of the collector elements are adjacent the next co-linear collector element for a high impedance or capacity coupling. It has been found that a closer spacing, that is, a higher capacity coupling, is desirable for the collector elements near the front end 125 than for those near the dipole 117. It has also been observed that the exact spacing between the near ends 126 of the first collector element 127, relative to the end of the dipole 117, is much more critical than is the spacing between ends of collector elements at the front end 125. The spacing between the near end 126 and the end of the dipole 117 has been found to be most effective when approximately .02 wave length. It has also been found that the collector elements near the front end 125 may be slightly over-lapped lengthwise, yet spaced, and this permits a slight reduction in overall length of the complete array.

The entire array with a total of twenty collector elements 123 in conjunction with the reflectors 119, 121, and 122; and the element 120 has been observed to have about twenty db gain over the resonant dipole 117 alone. If all the collectors 123 are removed yet retaining the reflectors and director 120, the db gain is only about nine db. This means that the collectors, when added to the antenna array, produce a signal increase of approximately ten times.

The driven element 117 is, of course, connected at the center of a feed point 115 to a feed line, so as to act either as a transmitting or receiving antenna. The connection to the feed line is made in any suitable manner, such as by a matching stub 116, and the feed point may be considered to be a reference point on the generally elliptical path of the collector elements 123. The plane of the entire array contains this reference point, and the driven element may be considered to be a means for coupling the matching stub to the co-linear sets of collector elements 123 on each side of this driven element or matching stub.

Figure 13:
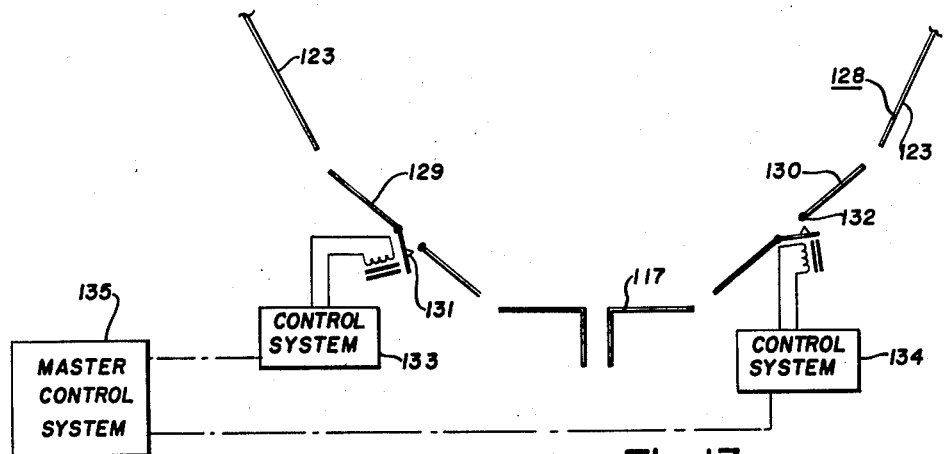
FIGURE 13 is a circuit diagram showing how the antenna array of FIGURE 8 may be effectively switched in and out.

The FIGURE 13 shows a portion of an antenna array 128 which may be quite similar to the antenna array 118. Again the resonant dipole 117 is used together with the collector elements 123. However, collector elements 129 and 130 are used immediately adjacent the dipole 117 which are special elements comprised of an open dipole. The open dipoles 129 and 130 are identical and each may be considered as formed from two co-linear quarter wave length elements. Electrically operated high dielectric switches 131 and 132 are provided at the middle of each of these open dipoles 129 and 130, respectively, with these electrically operated switches controlled by control systems 133 and 134, respectively, each in turn connected to a master control 135. When the switches 131 and 132 are closed, the elements 129 and 130 are effectively a half wave element which acts the same as the other collector elements 123 and thus renders effective the entire antenna array 128. When the electrically operated switches 131 and 132 are open, this destroys the resonant feature of the elements 129 and 130 and minimizes the coupling between the dipole 117 and the co-linear collector elements 123 on the open end of the antenna array 128.

Figure 10:
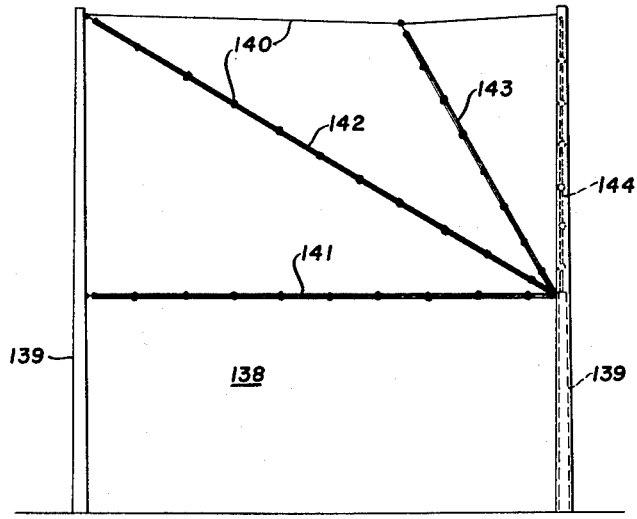
FIGURE 10 is a side view of an antenna system using antenna arrays similar to those of FIGURE 8.
Figure 11:
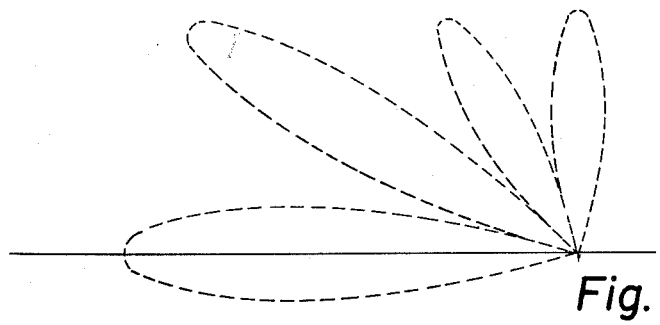
FIGURE 11 is an elevational view of the beam patterns obtainable with the antenna of FIGURE 10.
Figure 12:
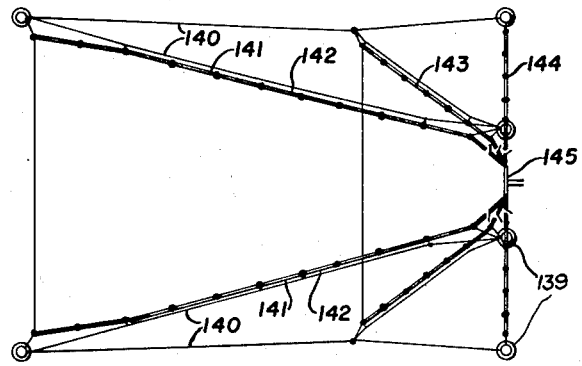
FIGURE 12 is a plan view of the antenna of FIGURE 10.

The FIGURES 10, 11, and 12 show a scannable directional antenna system 138. Supporting towers 139 may be used to support non-conductive cables 140 on which the entire system may be carried. The FIGURES 10 and 12 show that the entire antenna system 138 includes four antenna arrays 141 through 144, each of which may be generally similar to the antenna array 128 shown in FIGURE 13. Only a single driven element 145 is used with all four antenna arrays 141 through 144. This driven element will effectively feed each of the four antenna arrays. The antenna arrays 141–144, being similar to the antenna array 128 of FIGURE 13, may be controlled by the electrically operated switches 131 and 132. The two switches in each of the four antenna arrays may be individually closed to obtain a lobe switching of the entire antenna system. If these switches were all simultaneously closed, it would form a fan-shaped beam from horizontal to vertical. The control systems 133 and 134 and the master control system 135 may be applied to the antenna system of FIGURES 10 and 12 to control this lobe switching which is therefore a form of beam scanning, and the FIGURE 11 is an elevation view of the beams attainable by each of the arrays 141–144 in the antenna system 138.

The use to which the antenna system 138 may be put will often require a longer beam or lobe toward the horizon than toward the zenith, and this antenna system 138 accomplishes this by providing more collector elements 133 in the antenna array 141 than in the upwardly directed arrays 143 and 144.

The antenna array 141 of FIGURE 10 shows a convenient way to build such array either for the HF or UHF spectrums. The antenna elements may simply be metallic tubes and insulator beads alternately strung on a non-conductive cable or cord, such as nylon or glass fiber cables, with support cables running to the insulator beads as required to pull the entire array into the desired generally elliptical shape.

Also, the entire antenna system of FIGURES 10 and 12 may be approximately doubled, with additional arrays to the right, as viewed in these figures, to produce an antenna system capable of scanning from horizon to horizon through the zenith.

The antenna system 138 of FIGURES 10 and 12 may be incorporated into the airport control system of FIGURES 1 and 2. For example, this antenna system could be located at the receiver location 28 with the beams or lobes directed outwardly along the airway 23 with the control systems 133–134 and master control system 135 connected back to the control tower at the airport 21, the control tower personnel are able to perform lobe switching to direct the beam at the desired angle to intercept the approaching aircraft. They are thus able to determine if such approaching aircraft is within range long before the aircraft actually passes immediately over the receiver location. This can give added control and assurance to the aircraft pilots during instrument flying.

In the aforementioned first or reference system of Doppler detection using one travelling wave receiving antenna and one focal point collecting antenna, the antenna system 138 would be used as the focal point collector when lobe switching was desired. In the second or non-reference system of Doppler detection hereinbefore described, two such antenna systems similar to the system 138 would be used at the particular receiver location so that the beams or lobes could be simultaneously directed in a given direction for intercepting the aircraft.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An aircraft detection system comprising, in combination, a transmitting antenna at a first location, said transmitting antenna being directional and beamed in a first direction to establish a zone of detection, said transmitting antenna emitting waves in the VHF region and being substantially a focal point radiator, a receiving location on the earth's surface remote from the transmitting antenna a distance sufficient so that the transmitting antenna field is considerably attenuated, first and second receiving antennas at said receiving location each being directional and beamed in said zone of detection, said second receiving antenna being substantially a focal point antenna, means for obtaining from said transmitting antenna a first signal at said first receiving antenna which is substantially entirely at a single frequency at a given instant, aircraft moving within said zone of detection reflecting waves from said transmitting antenna to said second receiving antenna to form a second signal of varying phase, and phase comparison means connected to said first and second receiving antennas to compare the relative changes in phase between said first and second signals.

2. An aircraft detection system comprising, in combination, a transmitting antenna at a first location, a receiving location on the earth's surface remote from said transmitting antenna, a detector at said receiving location, first and second receiving antennas spaced at said receiving location and each being directional, said first receiving antenna being a travelling wave antenna and beamed toward said transmitting antenna to receive substantially only the direct wave from said transmitting antenna, means for sweeping the beam of said second receiving antenna in a plane to be beamed at any aircraft passing through and near a zone of detection determined by coincidence of the field of said transmitting antenna and said second receiving antenna beam, whereby aircraft flying within said zone of detection reflect waves from said transmitting antenna to said second receiving antenna, and means at said detector to produce a beat note in accordance with the changing phase of the signals received at said first and second receiving antennas to indicate the passage of any said aircraft.

3. An aircraft detection system comprising, in combination, a transmitter and transmitting antenna at a first location, said transmitting antenna having a main directional lobe beamed in a first direction, said transmitting antenna being substantially a focal point radiator, a receiving location on the earth's surface remote from the transmitting antenna a distance sufficient to be below line of sight and below the main transmitted beam lobe from said transmitting antenna due to the curvature of the earth, a receiver at said receiving location, first and second receiving antennas spaced in a horizontal plane at said receiving location each being directional and tuned to the frequency of said transmitter, said first receiving antenna being a travelling wave antenna and beamed toward said transmitting antenna to receive substantially only the direct wave from said transmitting antenna, said second receiving antenna being a focal point collector, means for sweeping the beam of said second receiving antenna in a vertical plane from one horizon to the other through zenith to be beamed at any aircraft passing through and near a zone of detection determined by coincidence of said transmitting antenna beam and said second receiving antenna beam, whereby aircraft flying within said zone of detection reflect waves from said transmitting antenna to said second receiving antenna, and means at said receiver to produce a beat rate output in accordance with the changing path lengths of the signals received at said first and second receiving antennas to indicate the passage of any said aircraft.

4. An aircraft detection system comprising, in combination, a transmitting antenna at a first location, said transmitting antenna emitting waves in the VHF region, a receiving location on the earth's surface remote from the transmitting antenna a distance sufficient so that the transmitting antenna field is considerably attenuated, a receiver at said receiving location, first and second receiving antennas at said receiving location each being directional and beamed upwardly to establish a zone of detection determined by coincidence of said transmitting antenna field and said two receiving antenna fields, whereby aircraft flying within said zone of detection reflect waves from said transmitting antenna to said first and second receiving antennas, and means at said receiver to compare the changing phase of the signals received at said first and second receiving antennas to indicate the passage of any said aircraft.

5. An aircraft detection system comprising, in combination, a transmitting antenna at a first location, said transmitting antenna being directional and beamed in a first direction to establish a zone of detection, said transmitting antenna emitting waves in the VHF region and being substantially a focal point radiator, a receiving location on the earth's surface remote from the transmitting antenna a distance sufficient to be below line of sight and below the transmitted beam from said transmitting antenna due to the curvature of the earth, a receiver at said receiving location, first and second substantially focal point receiving antennas spaced in a horizontal place at said receiving location each being directional and beamed in a vertical plane within said zone of detection, the beam of said receiving antennas being capable of simultaneously sweeping in said zone from one horizon to the other through the zenith to be beamed at any aircraft passing within said zone, whereby aircraft within said zone reflect waves from said transmitting antenna to said first and second receiving antennas, means at said receiver to compare the phase of the signals received at said first and second receiving antennas to indicate the passage of any said aircraft, and means connected to the output of said receiver to indicate the beat rate of the two received signals to determine ground speed of any said aircraft.

6. A moving object detection system for objects moving generally along a path, comprising, a transmitting antenna, first and second receiver locations positioned on opposite sides of said path to establish a pair of receiver locations, at least said first receiver location having first and second receiving antennas to receive first and second signals, respectively, coincidence of fields of said transmitting and second receiving antenna establishing a zone of detection, moving objects within said zone of detection reflecting waves from said transmitting antenna to said second receiving antenna to form said second signal of changing phase, means for obtaining from said transmitting antenna said first signal at said first receiving antenna which is substantially entirely at a single frequency at a given instant, and means to compare the relative energy of the two signals received at two receiving antennas in said pair of receiver locations to indicate the horizontal deviation of any said object from said path.

7. A moving object detection system for objects moving generally along a path comprising, a transmitting antenna, first and second receiver locations positioned on opposite sides of said path to establish a pair of receiver locations, at least said first receiver location having first and second receiving antennas to receive first and second signals, respectively, coincidence of fields of said transmitting and second receiving antenna establishing a zone of detection, moving objects within said zone of detection reflecting waves from said transmitting antenna to said second receiving antenna to form said second signal of changing phase, means for obtaining from said transmitting antenna said first signal at said first receiving antenna which is substantially entirely at a single frequency at a given instant, phase comparison means connected to said first and second receiving antennas in said first receiver location to compare the relative changes in phase between said first and second signals to provide information for determining one of elevation, direction, and speed of any said moving objects moving generally along said path within said zone of detection, and means to compare the relative energy of the two signals received at two receiving antennas in said pair of receiver locations to indicate the horizontal deviation of any said object from said path.

8. A moving object detection system for objects moving generally along a path, comprising, a transmitting antenna, a row of receiver locations positioned on at least a first side of said path, each of said receiver locations having first and second receiving antennas to receive first and second signals, respectively, coincidence of fields of said transmitting and at least one of said second receiving antennas establishing a zone of detection, moving objects within said zone of detection reflecting waves from said transmitting antenna to said one second receiving antenna to form said second signal of changing phase, means for obtaining from said transmitting antenna said first signal at said first receiving antenna which is substantially entirely at a single frequency at a given instant, and phase comparison means connected to said first and second receiving antennas for each receiver location to compare the relative changes in phase between said first and second signals to provide information for determining one of elevation, direction, and speed of any said moving objects moving generally along said path within said zone of detection.

9. A moving object detection system for objects moving generally along a path, comprising, a transmitting antenna near said path, first and second rows of receiver locations positioned one on each side of said path, a receiver location in said first row corresponding to a receiver location in said second row to establish pairs of receiver locations, each of said receiver locations in at least said first row having first and second receiving antennas to receive first and second signals, respectively, coincidence of fields of said transmitting and at least one of said second receiving antennas establishing a zone of detection, moving objects within said zone of detection reflecting waves from said transmitting antenna to said one second receiving antenna to form said second signal of changing phase, means for obtaining from said transmitting antenna said first signal at said first receiving antenna which is substantially entirely at a single frequency at a given instant, phase comparison means connected to said first and second receiving antennas for each receiver location in at least said first row to compare the relative changes in phase between said first and second signals to provide information for determining one of elevation, direction, and speed of any said moving objects moving generally along said path within said zone of detection, and means to compare the relative energy of the two signals received at two receiving antennas in each pair to indicate the horizontal deviation of said object from said path.

10. A moving object detection system for objects moving generally along a path, comprising, a transmitting antenna near said path, first and second rows of receiver locations positioned on each side of said path, a receiver location in said first row corresponding to a receiver location in said second row to establish pairs of receiver locations, the spacing of said pairs of receiver locations in said rows increasing as the distance from said transmitting antenna increases, each of said receiver locations in at least said first row having first and second receiving antennas to receive first and second signals, respectively, the spacing of said first and second receiving antennas in each of said receiver locations increasing as the distance from said transmitting antenna increases, coincidence of fields of said transmitting and second receiving antenna establishing a zone of detection, moving objects within said zone of detection reflecting waves from said transmitting antenna to said second receiving antenna to form said second signal of changing phase, means for obtaining from said transmitting antenna said first signal at said first receiving antenna which is substantially entirely at a single frequency at a given instant, phase comparison means connected to said first and second receiving antennas for each receiver location in at least said first row to compare the relative changes in phase between said first and second signals, and means to compare the relative energy of the two signals received at two receiving antennas in each pair to indicate the horizontal deviation of said object from said path.

11. An airport radio control system for an airport having a runway onto which aircraft land from a flight and glide path, comprising, a transmitting antenna near and substantially aligned with said runway, first and second rows of receiver locations on each side of said glide path, a receiver location in said first row corresponding to a receiver location in said second row to establish pairs of receiver locations, the spacing of said pairs of receiver locations in said rows increasing as the distance from said runway increases, each of said receiver locations in at least said first row having a first and second receiving antennas to receive first and second signals, respectively, coincidence of fields of said transmitting and second receiving antenna establishing a zone of detection, aircraft within said zone of detection reflecting waves from said transmitting antenna to said second receiving antenna to form said second signal of changing phase, means for obtaining from said transmitting antenna said first signal at said first receiving antenna which is substantially entirely at a single frequency at a given instant, phase comparison means connected to said first and second receiving antennas for each receiver location in at least said first row to compare the relative changes in phase between said first and second signals, and means to compare the relative energy of the two signals received at two receiving antennas in each pair to indicate the horizontal deviation of said aircraft from said glide path.

12. An airport radio control system for an airport having a runway onto which aircraft land from a flight and glide path, comprising, a transmitting antenna near and substantially aligned with said runway, first and second rows of receiver locations positioned equidistantly on each side of said glide path starting from positions near one end of said runway, a receiver location in said first row corresponding to a receiver location in said second row to establish pairs of receiver locations, the spacing of said pairs of receiver locations in said rows increasing as the distance from said runway increases, each of said receiver locations having first and second receiving antennas to receive first and second signals, respectively, the spacing of said first and second receiving antennas in each of said receiver locations increasing as the distance from said runway increases, coincidence of fields of said transmitting and second receiving antenna establishing a zone of detection, aircraft within said zone of detection reflecting waves from said transmitting antenna to said second receiving antenna to form said second signal of changing phase, means for obtaining from said transmitting antenna said first signal at said first receiving antenna which is substantially entirely at a single frequency at a given instant, phase comparison means connected to said first and second receiving antennas for each receiver location in at least said first row to compare the relative changes in phase between said first and second signals, and means to compare the relative energy of said second signals received at the two second receiving antennas in each pair to indicate the horizontal deviation of said aircraft from said glide path.

13. An airport radio control system for an airport having a runway onto which aircraft land from a flight and glide path, comprising, a transmitting antenna near and substantially aligned with said runway, first and second rows of receiver locations positioned equidistantly on each side of said glide path starting from positions near one end of said runway, a receiver location in said first row corresponding to a receiver location in said second row to establish pairs of receiver locations, the spacing of said pairs of receiver locations in said rows increasing as the distance from said runway increases, each of said receiver locations having first and second receiving antennas to receive first and second signals, respectively, the spacing of said first and second receiving antennas in each of said receiver locations increasing as the distance from said runway increases, coincidence of fields of said transmitting and second receiving antenna establishing a zone of detection, aircraft within said zone of detection reflecting waves from said transmitting antenna to said second receiving antenna to form said second signal of changing phase, means for obtaining from said transmitting antenna said first signal at said first receiving antenna which is substantially entirely at a single frequency at a given instant, phase comparison means connected to said first and second receiving antennas for each receiver location in at least said first row to compare the relative changes in phase between said first and second signals, and means to compare the relative energy of said second signals received at the two second receiving antennas in each pair of indicate the horizontal deviation of said aircraft from said glide path.

References Cited by the Examiner
UNITED STATES PATENTS

| | | | |
|---|---|---|---|
| 1,981,884 | 11/34 | Taylor et al. | 343—8 |
| 2,817,081 | 12/57 | Roberts | 343—9 |

CHESTER L. JUSTUS, *Primary Examiner.*